F. W. ROGLER.
RING VALVE.
APPLICATION FILED DEC. 26, 1906.

921,892.

Patented May 18, 1909.
3 SHEETS—SHEET 1.

Witnesses.
Jesse N. Lutton
R. V. Sommers

Inventor.
Fredrick William Rogler
by Henry Orth
Atty.

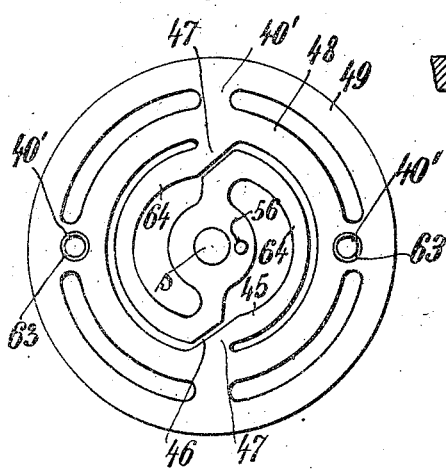
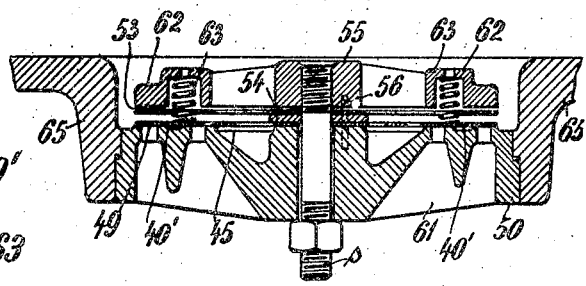
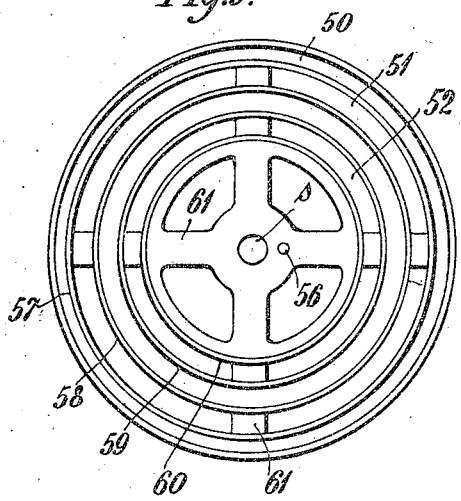
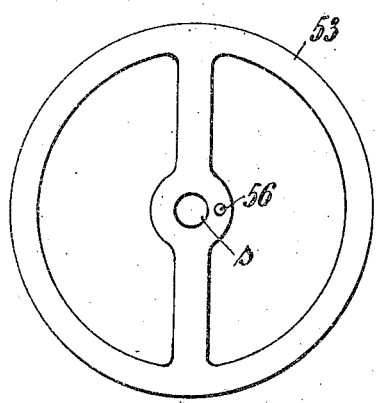
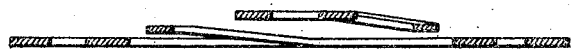

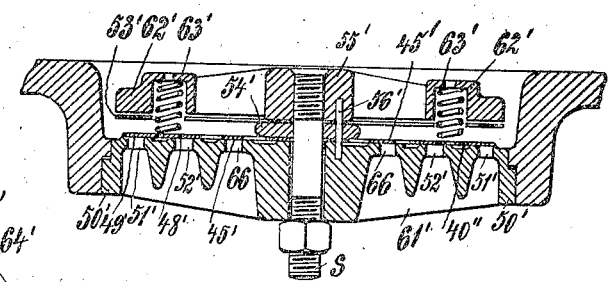

UNITED STATES PATENT OFFICE.

FREDRICK WILLIAM ROGLER, OF VIENNA, AUSTRIA-HUNGARY.

RING-VALVE.

No. 921,892.      Specification of Letters Patent.      Patented May 18, 1909.

Application filed December 26, 1906. Serial No. 349,403.

*To all whom it may concern:*

Be it known that I, FREDRICK WILLIAM ROGLER, a citizen of the United States of America, residing at Vienna, Austria-Hungary, have invented certain new and useful Improvements in Ring-Valves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to ring valves for blowing engines, pumps, compressors and the like, and has for its object to construct such valve of flexible material having one or more connected discontinuous valve rings and one or more continuous rings all made of a single piece, as will hereinafter be more fully described and claimed.

Figure 1:
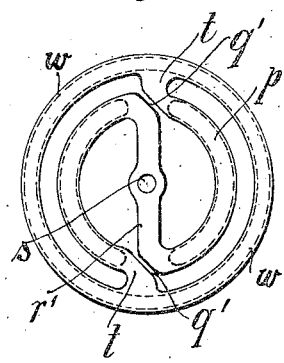
Figure 2:
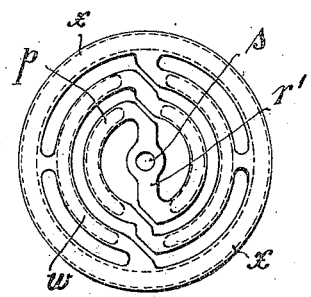
Figure 5:
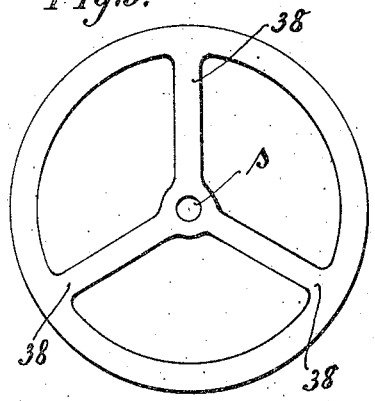
Figure 3:
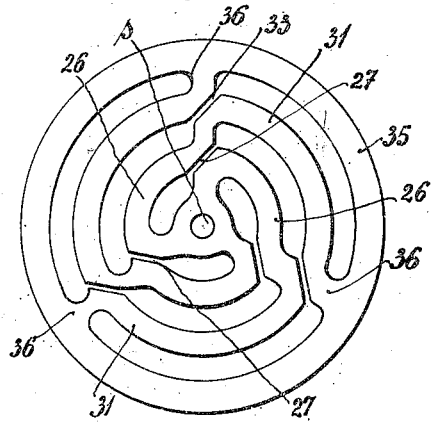
Figure 6:
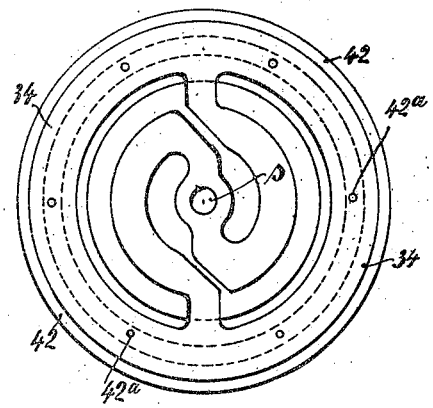
Figure 4:
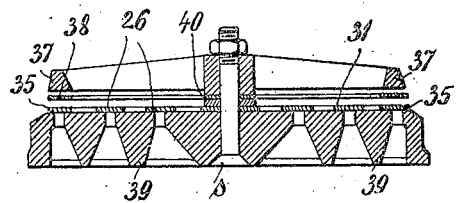
Figure 7:
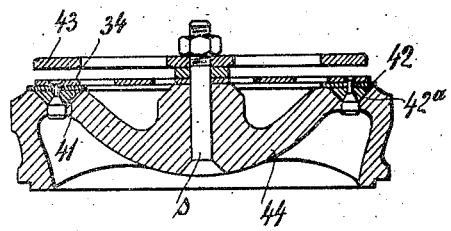

Referring to the drawings, in which like parts are similarly designated—Figure 1 is a double ring valve, one of the rings being double-split and the other continuous; Fig. 2 is a triple ring valve, having one continuous and two double-split rings; Fig. 3 shows an outer continuous ring and two central, triple-split rings. Fig. 4 is a diametrical section through such a valve and its mounting, and Fig. 5 shows the limit ring therefor; Figs. 6 and 7 show, respectively, a plan of a continuous ring valve, having a central double-split ring, and a diametrical section through the valve and mounting. Fig. 8 is a diametrical section through another form of valve; Fig. 9, a plan view of the seat; Fig. 10 a plan of the valve, and Fig. 11 a plan of the limit ring. Fig. 12 is a section showing a dished form of valve. Fig. 13 is a transverse section of another form of valve. Fig. 14 is a plan of its seat. Fig. 15 is a plan of the valve and Fig. 16 is a plan of the limit ring.

The invention comprises a valve consisting of one or more rings transversely or substantially transversely cut or split at several points of the periphery and being connected to one or more complete rings. Whether there be but a single split-ring or several split-rings, united to one or more full rings, the whole structure is made of a single piece of spring sheet metal or other suitable material and secured to the valve seat at the center of it. Such a valve unites the advantages of a flap valve and a ring valve without the disadvantages of these two forms of well known valves, as all the closing parts of the valve follow circular lines and are free from any rubbing or sliding movement. The concentric parts of the valve are spaced from one another radially so that the fluid controlled can pass between those parts and the valve seat.

In Fig. 1 I have shown a valve that has two concentric rings $p$ and $w$. The inner one $p$ is made as a discontinuous ring the two ring-halves of which are united by a diametrical arm $r'$ the ring being split or cut, or made discontinuous on each side of the arm $r'$ at $q'$ $q'$, the cuts being inclined to the diametrical arm $r'$. The free ends of the inner ring are connected by portions $t$, $t$ to the outer ring $w$, which is made as a continuous ring. The valve plate $p$ $w$, is secured to the center of the valve seat by a bolt passed through the center at $s$. Such a ring valve operates very well even when made of rather heavy sheet spring metal. In this valve the ends $t$ $t$ of the inner double split-ring $p$ $p$ move similarly and cause the outer ring $w$ when moving to and from its seat, to move parallel or substantially parallel thereto, with a very small extent of rotation, so that there will be no friction on the seat. A small pressure suffices to open or lift this valve, as the lever arm of the force tending to lift the valve is comparatively large. The arm $r'$ partakes somewhat of the movement of the valve.

In Fig. 2 I have shown a third continuous ring $x$, surrounding and united to the valve shown in Fig. 1, and in which the widths of the rings or the radial distance apart of the ring seats, or both, may increase from the center outward, in which cases the lift of the outer ring $x$ only, will require to be limited by a limit plate.

In the foregoing Figs. 1 and 2, the outlines of the openings in the valve seats under the ring are shown in dotted lines.

Fig. 3 shows a valve plate with three concentric rings, 26, 31, 35, the inner two consisting of three equal sections separated from each other by splits 27 and 33, and being connected to the outer continuous ring 35 by connecting pieces 36 all formed of a single piece of sheet metal. This valve is shown with its seat 39 in Fig. 4, a washer 40 distancing the cushioning ring 38 (shown in plan in Fig. 5) and having above the cushioning ring a limiting ring 37.

Fig. 6 is a plan, and Fig. 7 a section through a valve and valve seat similar to Fig. 1, carrying a leather or other packing ring 42 secured between the outer continuous ring 34 and the ring 41 seating in the recessed opening through the valve seat 44. Rivets 42ª secure the parts 34, 42 and 41 together, while the yielding limit ring 43 limits the lift of the valve.

The valve shown in plan in Fig. 10 comprises a central two-split ring 45, split at 46 and made narrower at the points 64 to increase the flexibility and connected at 47 to a continuous ring 48 which is connected at points 40' with the outer ring 49. Such a valve is designed for use as a suction valve, and its mount is shown in Fig. 8, the seat 50 of which is mounted in a cylinder head 65, the seat 61 being shown in plan in Fig. 9; 51 and 52 being openings therethrough and 57, 58, 59 and 60 the raised edges of these openings.

The cushioning ring 53, shown in plan in Fig. 11, is distanced from the valve by washer 54 and above the cushioning ring is a rigid limiting ring 55 having pockets 62 diametrically apart to receive coil springs 63 to aid in closing the valve, said springs taking over lugs 40' on the valve. A pin 56 prevents the parts from rotating.

The loading of the valve by springs 63 is not always necessary, but is advantageous in using very large valves with several rings, or very quick acting valves, and this requirement is often overcome by dishing the valve so that when it is secured to its seat 61 it will have a certain pressure thereon. In Fig. 12 such a dished form of valve is shown detached from its seat and not under tension. The ring 45 may be ground out at the narrowest points 64 in order to increase the flexibility.

For certain purposes, for example in valves having a large lift, it is of advantage to so arrange the valves, especially when additionally loaded by springs, that the plates when in closing position have a dished form, as shown in Fig. 12.

The valve shown in Fig. 15, like the one shown in Fig. 10 comprises a central ring 45' split at two points 46'. The segments of the ring 45' are, near the points 46', of greater width than at their middle at 64', and they are also ground out on the upper face to reduce the thickness at the points 64', thereby increasing the flexibility of the ring. At 47' said ring is connected to an unbroken ring 48', which latter at 40" is connected to an outer, likewise continuous, ring 49'. In this valve the three rings 49', 48' and 45' serve for closing ports 51', 52' and 66 respectively in the valve seat 50'. In Figs. 13 and 14 the edges of said ports are designated 57', 58', 59', 60', 67 and 68.

The cushioning ring 53', shown in Fig. 16 in plan, is held properly distanced from the valve by a disk 54'. Above, and slightly distanced from the cushioning ring is mounted a rigid limit ring 55' provided with diametrically opposite pockets 62' for the reception of spiral springs 63' which latter operate against the connecting pieces 40" and aid in closing the rings. The rings before being mounted on the valve seat 61' has a dished form similar to that shown in Fig. 12. The parts 55', 53' and 54' are prevented from rotation by a pin 56' taking through them into the valve seat.

I claim—

1. A sheet metal ring valve comprising a central portion and a plurality of concentric ring plates connected to one another and to the center, one or more rings between the center and outer ring being cut at symmetrical points of connection.

2. A sheet metal ring valve comprising a central portion and a plurality of ring plates connected to one another at a plurality of symmetrically arranged points, one or more rings between the center and outer ring being cut at the points where they connect to one another.

3. A sheet metal ring valve comprising one or more continuous outer rings connected to one or more concentric inner rings at a plurality of symmetrical points, the inner rings having a cut at the connecting points and a center similarly connected to the cut rings.

4. A ring valve comprising a center and a plurality of concentric rings inter-connected at symmetrically arranged points, the ring or rings between the center and outer ring being cut at the points of connection the whole being formed of a single piece of sheet metal and dished.

5. A sheet metal ring valve comprising a central portion and a plurality of concentric rings, the ring or rings between the center and outer ring or rings being connected thereto at a plurality of symmetrically arranged points and being cut at said points, and means to additionally spring-load the valve.

6. The combination with a sheet metal valve comprising a plurality of concentric rings connected to one another at symmetrically arranged points, the inner ring or rings cut at said points; of a valve seat having an annular port controlled by the outer ring.

7. The combination with a sheet metal valve comprising a plurality of concentric rings connected together at symmetrically arranged points, the inner ring or rings cut at said points; of a valve seat having concentric ports the outer ring of said valve as well as the inner sector rings controlling said ports.

8. A sheet metal ring valve comprising a plurality of concentric rings connected together at symmetrically arranged points, the inner ring or rings cut at said points to form sectors and each sector narrowed intermediate its ends at the points of connection.

9. A sheet metal ring valve comprising a plurality of concentric rings connected together at symmetrically arranged points, the inner ring or rings being cut at said points and the segments between said points being made thinner at their middle.

10. The combination with a sheet metal valve comprising a plurality of concentric rings connected to one another at symmetrically arranged points, the inner ring or rings being cut at said points; of a rigid limit ring and a resilient cushioning ring spaced from one another and opposite the valve.

11. In an air-compressor, a valve comprising a resilient sheet-metal disk cut to provide central and peripheral portions joined by two oppositely disposed substantially concentric curved strips the concentric portions of the valve having spaces between them.

12. In an air-compressor, a valve comprising a resilient sheet-metal disk cut to provide central and peripheral portions joined by two oppositely disposed substantially concentric curved strips, and securing means for said central portions the concentric portions of the valve having spaces between them.

13. In an air-compressor, an annular valve-port, a resilient sheet-metal disk valve cut to provide central and peripheral portions joined by two oppositely disposed substantially concentric curved strips, said peripheral portion disposed over said port and said central portion secured within said port the concentric portions of the valve having spaces between them.

14. A sheet metal ring valve comprising a plurality of concentric rings connected together at symmetrically arranged points, the inner ring or rings being cut at said points and the segments between said points having a diminished cross section at their middle.

15. A valve comprising a sheet metal disk or plate having integral spring arms in combination with its seat provided with a port or ports controlled by the main portion of said disk or plate and also provided with a port or ports controlled by the integral spring arms.

16. A valve comprising a sheet metal disk or plate having a central portion and an outer portion connected by integral arms, in combination with a seat provided with a port or ports controlled by the outer portion and also a port or ports controlled by the arms.

In testimony that I claim the foregoing as my invention, I have signed my name in presence of two subscribing witnesses.

FREDRICK WILLIAM ROGLER.

Witnesses:
ALVESTO S. HOGUE,
AUGUST FUGGER.